United States Patent [19]

Hall

[11] Patent Number: 5,228,558
[45] Date of Patent: Jul. 20, 1993

[54] CONTROL SYSTEM FOR AN ACCUMULATING CONVEYOR

[75] Inventor: David V. Hall, Wilmington, N.C.

[73] Assignee: Interroll Holding A.G., San Antonio, Switzerland

[21] Appl. No.: 811,948

[22] Filed: Dec. 23, 1991

[51] Int. Cl.[5] .............................................. B65G 13/06
[52] U.S. Cl. ................................. 198/784; 198/571; 198/575; 198/576; 198/577; 198/579
[58] Field of Search ............... 198/781, 784, 788, 571, 198/572, 575, 576, 577, 579

[56] References Cited

U.S. PATENT DOCUMENTS

| | | | |
|---|---|---|---|
| 3,960,262 | 6/1976 | Henig | 198/579 X |
| 3,992,182 | 11/1976 | Frank | 198/784 X |
| 4,109,783 | 8/1978 | Vogt | 198/781 |
| 5,038,915 | 8/1991 | Delsanto | 198/460 X |
| 5,088,596 | 2/1992 | Agnoff | 198/788 |

Primary Examiner—Robert P. Olszewski
Assistant Examiner—Cheryl L. Gastineau

[57] ABSTRACT

An accumulating conveyor includes a plurality of load carrying rollers over which loads are conveyed from an upstream end of the conveyor to a downstream end. The rollers are divided into a plurality of zones. Each zone includes at least one drive roller and may include one or more idler rollers. Each zone includes a controller which is connected between the power supply and the drive roller for that zone. The controller receives a variable input signal which is indicative of the drive roller speed for the immediately adjacent downstream zone, and produces an output signal based on the variable input signal. The output signal is used to adjust the speed of the associated drive roller and is also used as the input signal for the controller of the next adjacent upstream zone. Accordingly, the speed of each zone is continuously adjusted based on the speed of its immediately preceding zone.

20 Claims, 7 Drawing Sheets

CONTROL SYSTEM FOR AN ACCUMULATING CONVEYOR

FIELD OF THE INVENTION

The present invention relates generally to accumulating conveyors and more particularly to a control system for an accumulating conveyor which continuously adjusts the speed of a plurality of zones based on the speed of an adjacent zone.

BACKGROUND OF THE INVENTION

In general, an accumulating conveyor has a plurality of zones which can be selectively controlled to allow the articles being conveyed to accumulate in a selected area of the conveyor. Accumulation of articles is accomplished by disengaging the drive means from the conveyor rollers in the "accumulation zone", while zones upstream continue to convey articles downstream. When the initial accumulation zone is filled, the next adjacent upstream zone is halted so that articles will accumulate in that zone. As each successive zone fills, the status of the next adjacent upstream zone is changed to an accumulation mode. In this manner, articles can be backed-up from the discharge end of the conveyor to the infeed end. When the first article in the accumulation mode zone is removed, each zone is activated in sequence to advance the articles downstream.

As articles butt against one another in the accumulation zone, there is a possibility of some articles being jarred, smashed or otherwise damaged by the impact between loads. To avoid this problem, some accumulation conveyors sense the presence of an article in one zone and deactuate or disengage the drive for the next adjacent upstream zone. By selectively controlling each zone in this manner, the conveyed articles remain spaced apart and do not contact during accumulation.

While zero-pressure accumulating conveyors avoid damage to the articles being conveyed, there are some applications where it is desirable to "close-pack" the articles. That is, in some applications it is desirable to butt the articles being conveyed against one another in the accumulation zone. Therefore, there is a need for an accumulating conveyor which can close-pack articles without damage to the articles.

Another problem with prior art accumulating conveyors is that they require complicated mechanisms for alternatively engaging and disengaging the drive means and for braking the rollers. Such mechanical devices take up a large amount of space, are noisy during operation, and require maintenance.

Similarly, most prior art accumulating conveyors also require one or more photoelectric switching devices or weight sensing devices for proper operation. The placement of these photoelectric switches or other sensing devices is critical, and these types of sensing devices are subject to false indications as a result of improper placement.

SUMMARY OF THE INVENTION

The present invention is an accumulating conveyor in which articles can be closepacked without jarring or damaging the articles. The accumulating conveyor has a plurality of individually controlled zones. Each zone includes a controller which communicates with the controller for the adjacent upstream and downstream zones. Each controller receives a signal from a controller in the immediately adjacent downstream zone, and modifies the speed of the controlled zone based upon the information received. For example, if the speed of the conveyor in one zone is slowed, its controller will send a signal to the controller in the next adjacent upstream zone indicative of its present condition. The second controller will then modify the speed of its controlled zone and signal the controller in the next adjacent upstream zone. The controllers sequentially pass the signal up the conveyor line from one controller to the next, and if any action is called for, the controllers will modify the speeds of the controlled zones.

A significant advantage of the present invention is that the loads can be decelerated gradually prior to making contact with an already stopped load. Deceleration of a load prior to contact with another load minimizes the impact between loads. For example, if a load is stopped in one zone, the speed of the upstream zones will be stepped up gradually from one zone to the next until the maximum speed is reached at a zone upstream from the stalled zone. As a result, the loads will come to a gradual stop since they will be slowed as they get closer to the stalled zone. Similarly, loads can be gradually accelerated when the conveyor is reactivated to minimize jolting when the conveyor restarts.

Based on the foregoing, it is a primary object of the present invention to provide an accumulating conveyor having a plurality of zones, wherein the speed of each zone can be adjusted based on the speed of its immediately adjacent downstream zone.

Another object of the present invention is to provide an accumulating conveyor which is capable of closely packing loads in an accumulation zone without damage to the loads or their contents.

Another object of the present invention is to provide an accumulating conveyor which minimizes compression on the loads in the accumulation zone.

Another object of the present invention is to provide an accumulating conveyor which eliminates the need for complicated mechanical drive and brake mechanisms.

Still another object of the present invention is to provide an accumulating conveyor which eliminates the need for photoelectric sensing devices or other sensing devices.

Another object of the present invention is to provide an accumulating conveyor which uses an independent drive means for each individual zone.

Yet another object of the present invention is to provide an accumulating conveyor which is powered by a DC power source.

Other objects and advantages of the present invention will become apparent and obvious from a study of the following description and the accompanying drawings which are merely illustrative of such invention.

DETAILED DESCRIPTION OF THE INVENTION

Figure 1:
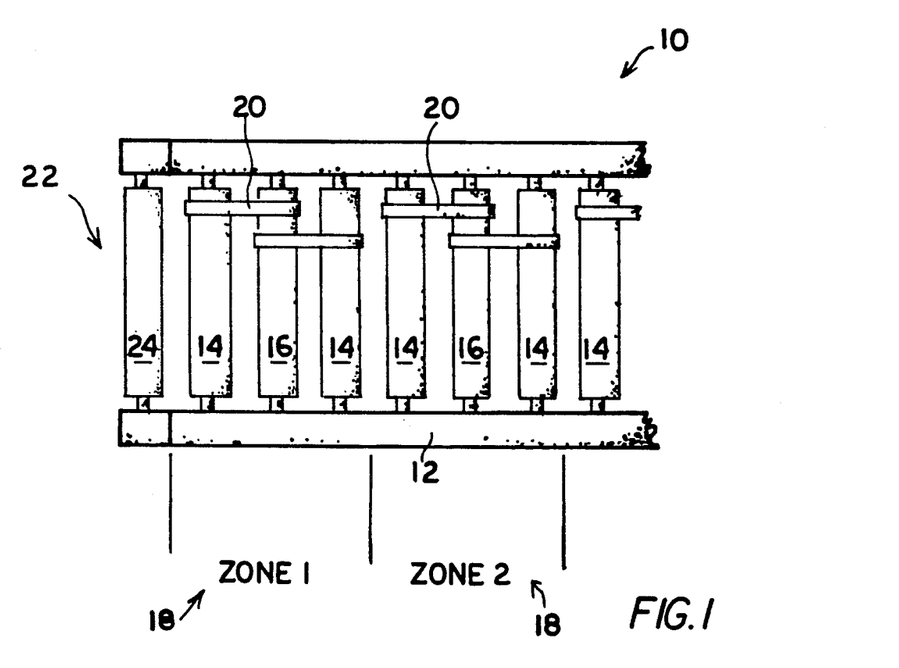
FIG. 1 is a plan view of the accumulating conveyor of the present invention.

Referring now to the drawings, the accumulating conveyor of the present invention is shown therein and indicated generally by the numeral 10. The conveyor 10 includes a conveyor frame having two side rails 12 and a plurality of rollers 14 and 16 rotatably mounted between the side rails 12. The rollers 14 and 16 collectively define a load carrying surface for transporting loads from an upstream end of the conveyor 10 to a downstream end.

The rollers 14 and 16 are divided into a plurality of zones 18 which consist of one or more rollers. Each zone 18 includes at least one drive roller 16, and may include one or more idler rollers 14. In the embodiment shown, each zone includes one drive roller 16 and two idler rollers 14. The drive roller 16 is connected to each of the idler rollers 14 by belts 20. Thus, the drive roller 16, and its companion idler rollers 14 will all rotate together.

In the preferred embodiment of the invention, each drive roller 16 includes a DC motor and a gear assembly which are contained within the roller tube so that no external drive means are required. This type of roller with a self-contained drive means is well-known to those skilled in the art. Therefore, a detailed description of the drive roller 16 is omitted. For more detailed information, one may refer to U.S. Pat. No. 5,088,596, which describes in detail one such roller suitable for use with the present invention.

At the downstream end of the conveyor 10, there is a stop indicated generally at 22. The stop 22 includes a stop roller 24 which can be raised and lowered by any suitable mechanical, electro-mechanical, or pneumatic actuator 26. When raised, the stop roller 24 acts as a positive stop which prevents any loads from being discharged from the conveyor 10. When lowered, the stop roller 24 acts as a support for removing a load from the conveyor 10. The construction of the stop roller 24 is the same as the drive roller 16.

Figure 2:
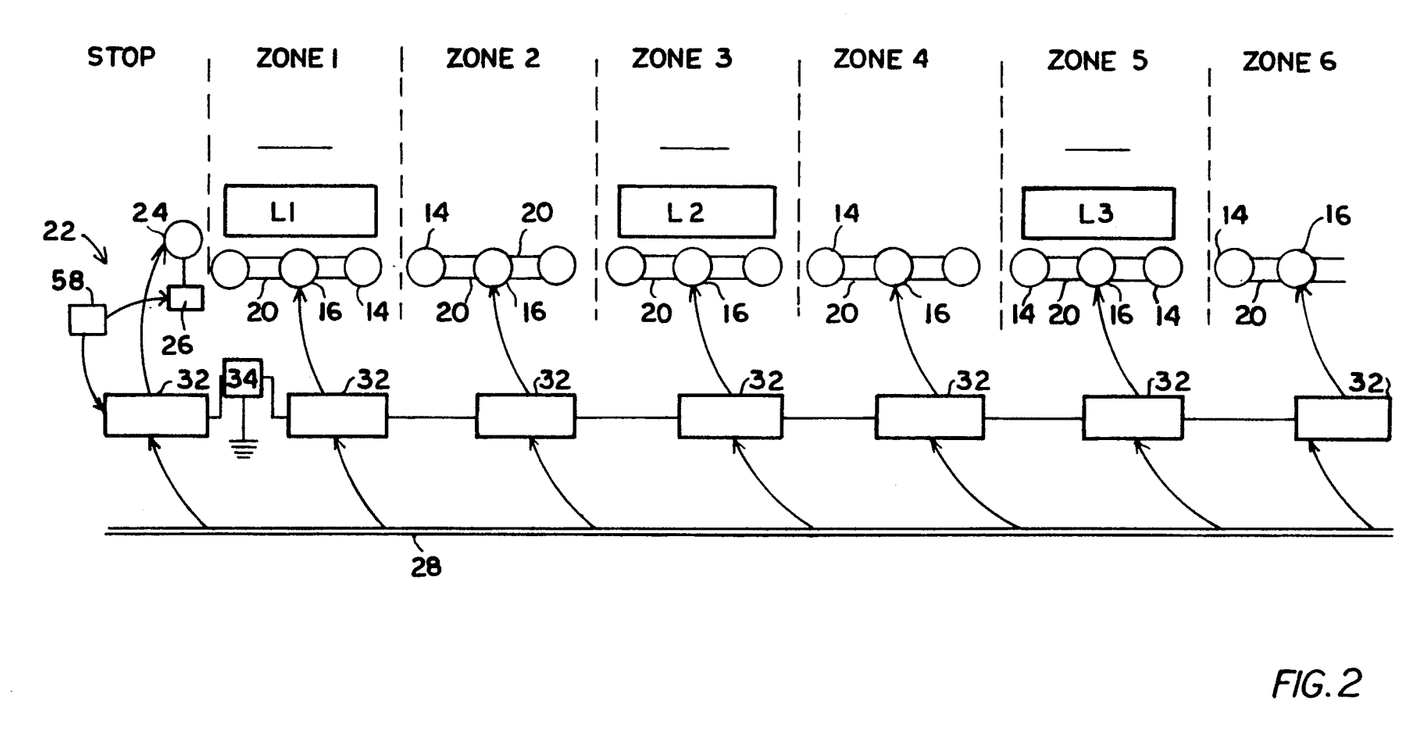
FIG. 2 is a schematic diagram of the accumulating conveyor and the control system therefore.

Referring now to FIG. 2, there is shown a schematic diagram of the accumulating conveyor 10 having siz zones 18. Each zone 18 includes a controller 32 which regulates the current and voltage applied to its associated drive roller 16. There is also a controller 32 for the stop roller 24. All of the controllers 32 are connected to a common 24 volt D.C. power supply 28. Each controller 32 is operatively connected to the controller 32 in the immediately adjacent downstream zone 18, and to the controller 32 in the immediately adjacent upstream zone 18. The controller 32 in the first zone (the controller 32 furthest downstream) is operatively connected through a resistor network 34 to the controller 32 for the stop roller 24.

Figure 3:
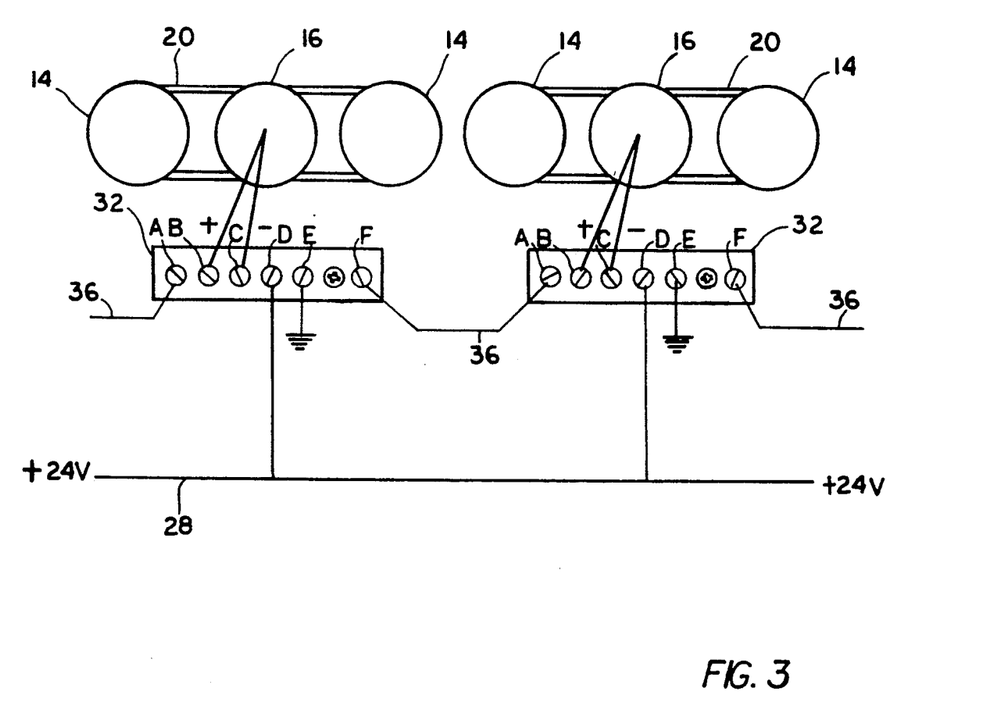
FIG. 3 is a schematic diagram illustrating how the controllers are connected.

FIG. 3 illustrates in schematic form how the controller 32 for each respective zone 18 of the conveyor 10 are linked. As shown in FIG. 3, each controller 32 includes six input/output terminals. Two of the terminals (terminals B and C) are connected to the leads of the corresponding drive roller 16. Terminals D and E are connected respectively to the 24 v power supply 28 and to ground. Terminals A and F represent the input and output terminals of the controller. As shown in FIG. 3, the output terminal F of each controller is connected by a jumper 36 to the input terminal A for the controller 32 of the next adjacent upstream zone 18. Thus, the controllers 32 form a continuous chain in which the output of each controller 32 is used as the input for the next adjacent upstream controller 32.

Figure 4:
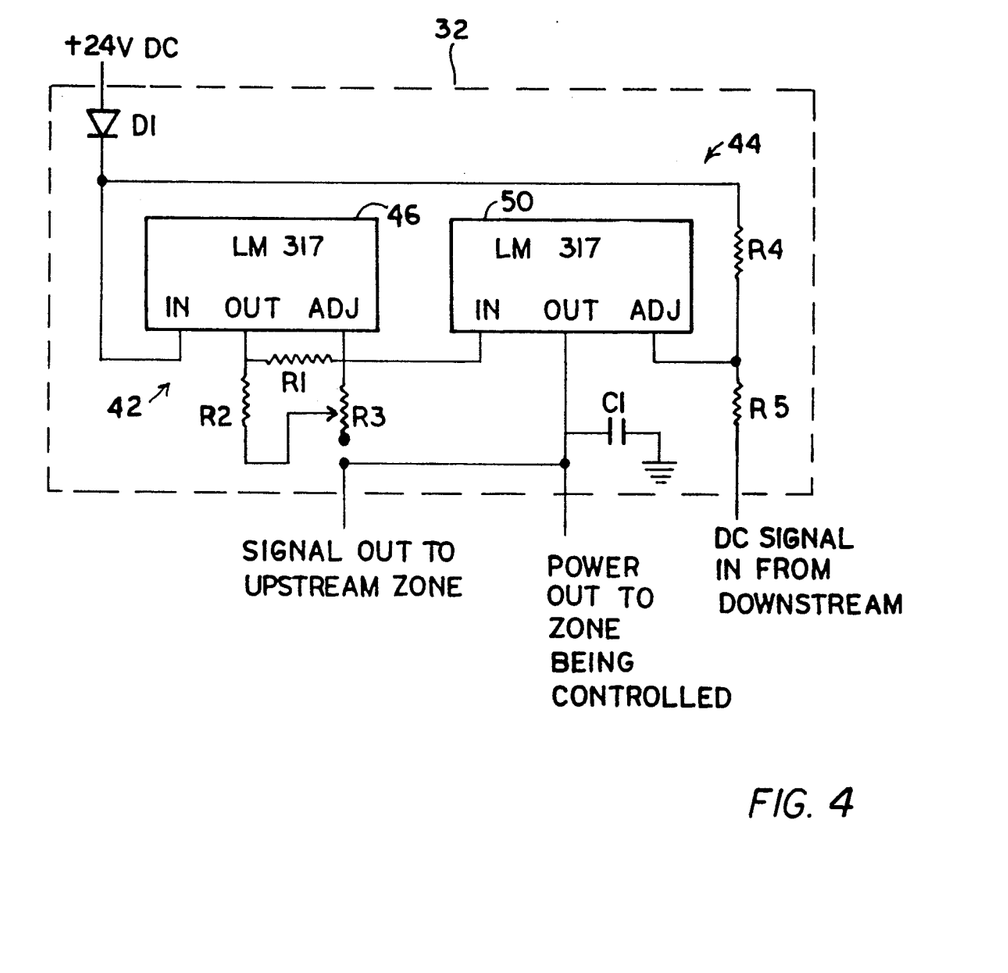
FIG. 4 is an electrical schematic of a controller.

FIG. 4 is a schematic for the controller 32. The controller 32 is connected to the 24 volt DC power supply through protection diode D1. The controller 32 includes a current limiting circuit 42 and a voltage regulating circuit 44. The current limiting circuit 42 includes a 3-terminal voltage regulator 46 and a resistor network 48 comprising resistors R1, R2, and variable resistor R3. Typical values for R1 and R2 are 22 ohms and 2 ohms respectively. R3 is variable between 0–10 ohms. The current limiting circuit 42 senses the current in the associated drive roller 16 and, upon reaching the threshold current established by the setting of the variable R3, reduces the voltage at the output of the current limiting circuit 42 to prevent the current from exceeding the threshold value. This in effect limits the supply voltage to the voltage regulating circuit 44. Under conditions where the conveyed items are not obstructed and are not undergoing acceleration, the current required by the drive roller 16 will drop below the threshold current. Under these conditions, the current limiting circuit 42 will pass the full voltage of the power supply minus the internal loss of about one volt to the voltage regulating stage 44 of the controller 32.

The current limiting circuit 42 serves several important fuctions. First, whenever a drive roller 16 is stalled, the current limiting circuit 42 will limit the current flowing through the drive roller 16, and thus limit the force applied by the drive roller 16 to any load resting on the drive roller 16. By reducing the force on the load being conveyed, the controller 32 allows accumulation with limited compression of downstream items on the conveyor 10. Secondly, upon removal of obstructions, the current limiting circuit 42 allows a "soft start" since the voltage passed to the voltage regulating circuit 44 will rise gradually as the load is accelerated. This gradual acceleration reduces jolting of the load which might damage the load or cause undesirable disturbances of loose items being conveyed on trays or pallets.

The voltage regulating circuit 44 comprises the second 3-terminal adjustable voltage regulator 50, and resistors R4 and R5. The resistors R4 and R5 function as a voltage divider to split the differential voltage between the input signal (i.e. the signal from the previous controller) and the 24 volt power supply 28 in a predetermined ratio. The resultant voltage is added to the input signal and applied to the adjustment leg (ADJ) of voltage regulator 50 to serve as a reference signal. Typical values for R4 and R5 are 220 ohms and 1,000 ohms, respectively, which results in the differential voltage being split by the resistors R4 and R5 such that of the differential voltage is dropped across R5. Thus, the reference signal (the signal at the adjustment leg of the voltage regulator 50) will be equal to the input signal plus 18% of the differential voltage. For example, if the input signal is equal to 4 volts, the differential voltage would be 20 volts. Thus, the signal at the adjustment leg of the voltage regulator 50 would be equal to 4 volts (input signal)+3.6 volts (18% of the differential voltage) or 7.6 volts.

The voltage regulator 50 provides an output voltage which is 1.25 volts over the reference signal at the adjustment leg. Thus, in the example given, an input signal from the previous zone of 4 volts would produce a reference signal at the adjustment leg of 7.6 volts, and an output voltage of 8.85 volts. This assumes, however, that the supply voltage to the voltage regulator 50 is sufficient to produce an output voltage of 8.85 volts. Because there is a voltage drop through the voltage regulator 50 of approximately 1 volt, there would need to be at least 9.85 volts at the input leg of the voltage regulator 50 in order to produce an output voltage of 8.85 volts. As previously described, if the drive roller 16 associated with the controller 32 is not stalled, or is not accelerating, the current limiting circuit 42 will pass full voltage minus approximately 1 volt to the input leg of the voltage regulator 50. Thus, the supply voltage at the input leg would be approximately 23 volts. If, however, the voltage passed by the current limiting circuit 42 to the input leg of the voltage regulator 50 is less than 9.95 volts, the output signal would equal the voltage at the input leg minus 1 volt (which represents the loss within the voltage regulator 50). Thus, the output of the voltage regulator 50 will always be the lower of supply voltage less 1 volt or the reference voltage plus 1.25 volts.

Each controller 32 functions in the same manner. Each controller 32 receives an input signal from the output of the previous controller 32, and outputs a slightly higher voltage to the next adjacent upstream controller 32 (except when the drive roller is stalled or is accelerating). As a result, the differential speed between any two zones 18 will be relatively small. Whenever the speed of one zone 18 is changed, the output signal produced by that controller 32 will also be changed to reflect the changed speed and the next adjacent upstream controller will adjust its speed of its drive roller 16 accordingly. In this manner, the speed of each zone 18 will be gradually increased from zone to zone until the maximum conveyor speed is reached.

The maximum conveyor speed will be determined by the power supply 28. The maximum voltage available to the drive roller 16 will be approximately two volts below the power supply due to the voltage drop across the voltage regulators 46 and 50. Thus, with a 24 volt power supply, there will be a maximum output voltage of 22 volts at any given zone. By increasing the voltage of the power supply 28, the maximum speed of the conveyor 10 can be increased.

The number of zones 18 over which the loads decelerate to a stop can be varied by changing the relative values of R4 and R5. In the described embodiment, seven zones 18 are required for the system to achieve full speed. If a lesser number of zones 18 were desired, this could be achieved by raising the value of R5. Conversely, to increase the number of zones 18 over which the loads are decelerated, the value of R5 could be reduced. This allows the user to control not only the maximum speed of the system, but the distance over which each load decelerates to a stop.

Figure 5:
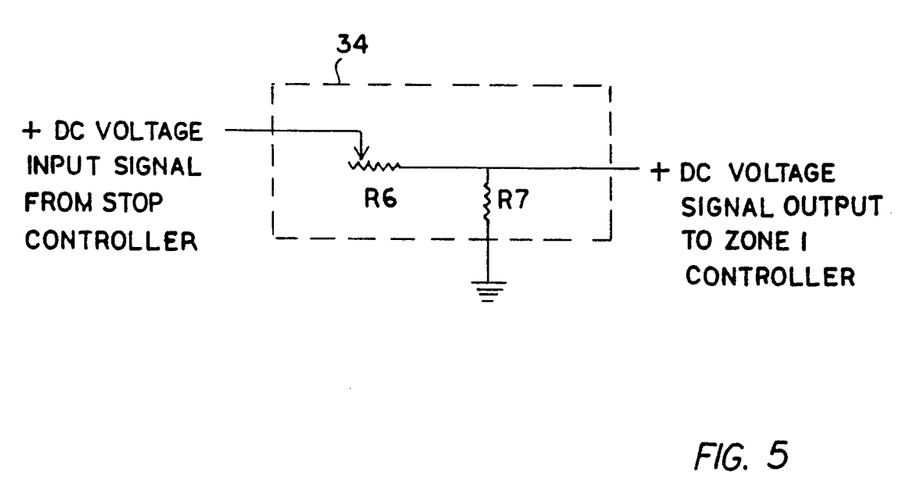
FIG. 5 is an electrical schematic of the resistor network preceding the first zone of the accumulating conveyor.

Referring now to FIG. 5, there is shown a schematic diagram illustrating the resistor network 34 between the stop mechanism 22 and the first zone 18 of the conveyor 10. The purpose of the resistor network 34 is to control the speed of the first zone 18 when the stop roller 24 is in the down position. It could also be used as an alternative stopping mechanism when there is no stop roller 24. The resistor network 34 comprises a variable resistor R6 and resistor R7 which is connected to ground. By reducing the value of the variable resistor R6, the speed of the first zone 18 will be increased. Conversely, when the value of the resistor R6 is raised, the speed of first zone 18 will be lowered. If it is desired to run the first zone at the maximum top speed possible, the value of R6 should be zero.

Figure 6:
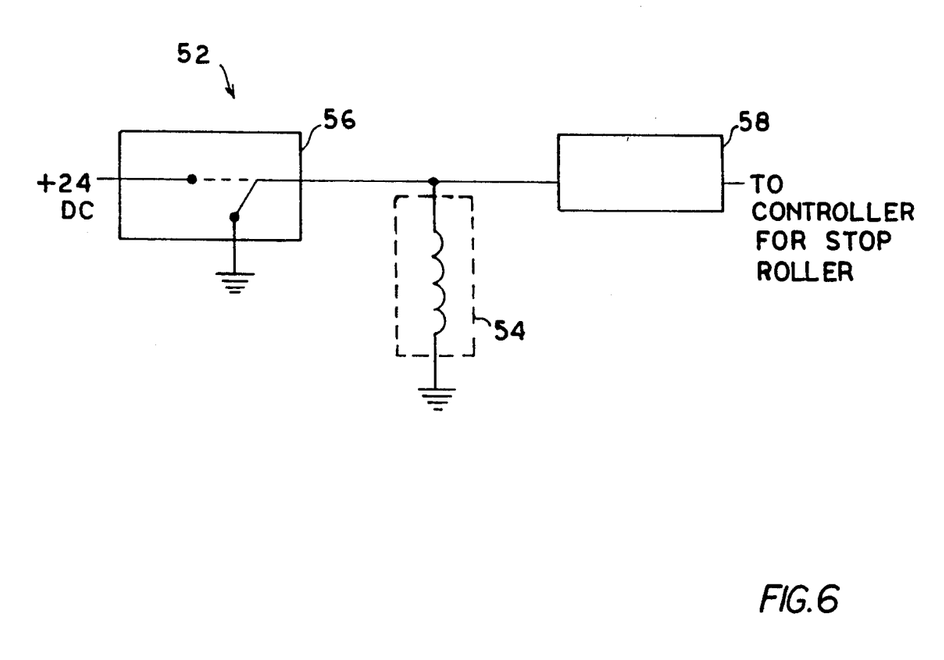
FIG. 6 is an electrical schematic of the controls for the stop roller.

FIG. 6 is a schematic diagram illustrating the control circuit 52 for the stop mechanism 22. The control circuit 52 includes a controller 32 as previously described for controlling the stop roller 24 and an actuator control solenoid 54. The actuator control solenoid 54 can be used either with an electro-magnetic solenoid 26 that lifts and lowers the stop roller 24, or alternatively, to control a pneumatic valve on a pneumatic actuator 26. Both the controller 32 and the actuator control solenoid 54 are connected to the 24-volt power supply 28 through a single pole, double-throw switch 56. A resistor network 58, which is identical to that shown in FIG. 5, is disposed between the controller 32 for the stop roller 24 and the switch 56 to allow adjustment of the speed of the stop roller 24.

When the switch 56 is closed, power is supplied to the actuator control solenoid 54, and to the controller 32. Upon energization, the actuator control solenoid 54 causes the stop roller 24 to be lowered by actuator 26. At the same time, power is supplied to the stop roller 24, which assists in accelerating the load in the first zone.

Referring now to FIGS. 7-11, there is shown a series of schematic diagrams illustrating the operation of the accumulating conveyor 10. FIGS. 7-11 show the conveyor 10 at various stages of operation, and Table 1 set forth the status, input voltage, output voltage, and speed of each zone. Table 1 assumes the following conditions:

| Power supply voltage | 24 v |
| Minimum voltage for motion | 2 v |
| No-load velocity at 22 v DC | 0.4 m/s |
| Variable resistor settings: | |
| R3 | 4.5 ohms |
| R6 | 0.0 ohms |
| Motor terminal resistance | 16 ohms |

TABLE 1

| FIG. # | Zone | Mode | Signal in | Volts | Speed | Signal Out |
|---|---|---|---|---|---|---|
| 7 | Stop | Off | 0.00 | 0.00 | 0.00 | 0.00 |
|  | 1 | Run | 0.00 | 5.58 | 0.07 | 5.58 |
|  | 2 | Run | 5.58 | 10.15 | 0.16 | 10.15 |
|  | 3 | Run | 10.15 | 13.90 | 0.24 | 13.90 |
|  | 4 | Run | 13.90 | 16.97 | 0.30 | 16.97 |
|  | 5 | Run | 16.97 | 19.49 | 0.35 | 19.49 |
|  | 6 | Run | 19.49 | 21.55 | 0.39 | 21.55 |
|  | 7 | Run | 21.55 | 22.00 | 0.40 | 22.00 |
| 8 | Stop | Off | 0.00 | 0.00 | 0.00 | 0.00 |
|  | 1 | Stall | 0.00 | 4.00 | 0.00 | 4.00 |
|  | 2 | Run | 4.00 | 8.86 | 0.14 | 8.86 |
|  | 3 | Run | 8.86 | 12.84 | 0.22 | 12.84 |

TABLE 1-continued

| FIG. # | Zone | Mode | Signal in | Volts | Speed | Signal Out |
|---|---|---|---|---|---|---|
| | 4 | Run | 12.84 | 16.10 | 0.28 | 16.10 |
| | 5 | Run | 16.10 | 18.77 | 0.34 | 18.77 |
| | 6 | Run | 18.77 | 20.97 | 0.38 | 20.97 |
| | 7 | Run | 20.97 | 22.00 | 0.40 | 22.00 |
| 9 | Stop | Off | 0.00 | 0.00 | 0.00 | 0.00 |
| | 1 | Stall | 0.00 | 4.00 | 0.00 | 4.00 |
| | 2 | Stall | 4.00 | 4.00 | 0.00 | 4.00 |
| | 3 | Run | 4.00 | 8.86 | 0.14 | 8.86 |
| | 4 | Run | 8.86 | 12.84 | 0.22 | 12.84 |
| | 5 | Run | 12.84 | 16.10 | 0.28 | 16.10 |
| | 6 | Run | 16.10 | 18.77 | 0.34 | 18.77 |
| | 7 | Run | 18.77 | 20.97 | 0.38 | 20.97 |
| 10 | Stop | Off | 0.00 | 0.00 | 0.00 | 0.00 |
| | 1 | Stall | 0.00 | 4.00 | 0.00 | 4.00 |
| | 2 | Stall | 4.00 | 4.00 | 0.00 | 4.00 |
| | 3 | Stall | 4.00 | 4.00 | 0.00 | 4.00 |
| | 4 | Run | 4.00 | 8.86 | 0.14 | 8.86 |
| | 5 | Run | 8.86 | 12.84 | 0.22 | 12.84 |
| | 6 | Run | 12.84 | 16.10 | 0.28 | 16.10 |
| | 7 | Run | 16.10 | 18.77 | 0.34 | 18.77 |
| 11 | Stop | Run | 24.00 | 22.00 | 0.40 | 22.00 |
| | 1 | Run | 22.00 | 22.00 | 0.40 | 22.00 |
| | 2 | Accell | 22.00 | 6.00 | 0.08 | 6.00 |
| | 3 | Stall | 6.00 | 4.00 | 0.00 | 4.00 |
| | 4 | Stall | 4.00 | 4.00 | 0.00 | 4.00 |
| | 5 | Stall | 4.00 | 4.00 | 0.00 | 4.00 |
| | 6 | Run | 4.00 | 8.86 | 0.14 | 8.86 |
| | 7 | Run | 8.86 | 12.84 | 0.22 | 12.84 |

Figure 7:
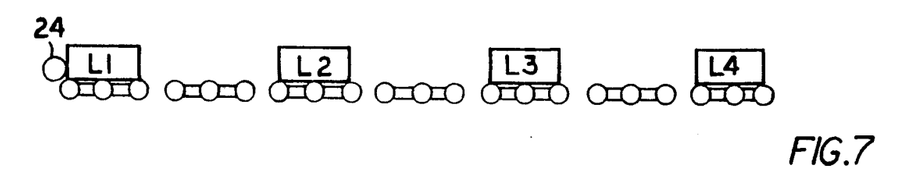
FIG. 7 is a schematic diagram showing the accumulating conveyor conveying loads toward the downstream end of the conveyor with the stop being in a raised position.

FIG. 7 shows the stop roller 24 raised with all zones in "run" mode. The drawing illustrates loads L1-L4 being conveyed toward the stop roller 24. The speed of zone 1 is 0.07, and the speed of each subsequent zone steps up gradually until the maximum speed of 0.40 m/sec. is reached in zone 7. The result is that loads will be gradually decelerated as they approach the stop roller 24. It will be readily seen from Table 1, that the input voltage to zone 1 is zero, and the output voltage is 5.58. The output voltage of zone 1 is sent to the next adjacent upstream controller. Thus, zone 2 has an input voltage of 5.58 volts, and an output voltage of 10.15 volts. The voltage is gradually stepped up from zone to zone until the maximum voltage of 22 volts is finally reached in zone 7.

Figure 8:
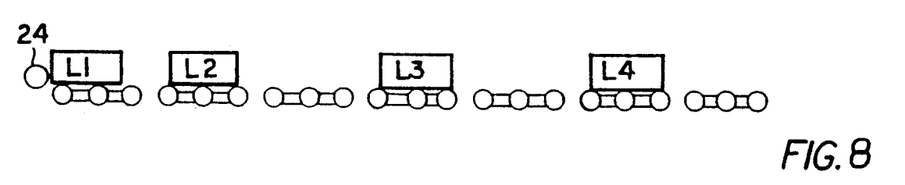
FIG. 8 is a schematic diagram showing the accumulating conveyor with the first load engaged with the stop, and the first zone being stalled.

In FIG. 8, load 1 has made contact with the stop roller 24 thereby stalling the drive roller 16 for zone 1. Loads L2-L4 are being conveyed downstream so that the remaining drive rollers 16 are in "run" mode. The input voltage to zone 1 remains unchanged. However, because the drive roller 16 for zone 1 is stalled, the current limiting circuit 42 of the controller 32 reduces its output voltage in order to limit current flowing through the drive roller 16. As a result, the current limiting circuit 42 does not pass full voltage to the voltage regulation circuit 44 of the controller 32 in zone 1. Consequently, the output voltage of the controller 32 for the first zone, which is the input for zone 2, is limited to 4.00 volts. The input for zones 3 through 7 are also reduced by corresponding amounts. Accordingly, the speed of zones 2 through 7 are reduced. Thus, loads being conveyed at full speed in zone 8 will be gradually decelerated as they pass through zones 7 to 2.

Figure 9:
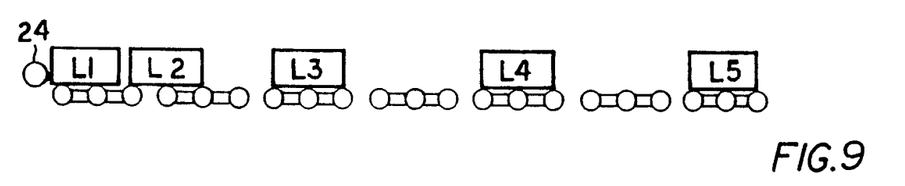
FIG. 9 is a schematic diagram showing the accumulating conveyor with the second load butting the first load and with the first two zones being stalled.

In FIG. 9, load L2 is butted against load L1 thereby stalling the drive roller 16 for zone 2. Loads L3-L5 are being conveyed towards the down-stream end of the conveyor. In this example, the input and output voltage for zone 1 remains the same as the previous example. That is, zone 1 outputs 4 volts to the controller 32 for zone 2. Because zone 2 is now stalled, the current limiting circuit 42 of the controller 32 for zone 2 will not pass full voltage. Thus, the output of zone 2 will also be limited to 4 volts, compared to 8.86 volts in the previous example. As a result, the speed of zones 3-7 are reduced further. The speed of the subsequent upstream zones are also reduced accordingly.

Figure 10:
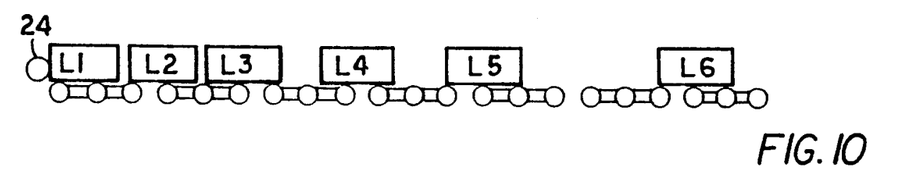
FIG. 10 is a schematic diagram showing the accumulating conveyor with the first three zones stalled, but only one load still in motion.

FIG. 10 shows the conveyor after zones 1-3 have stalled. It will be seen that the output voltage of the controllers 32 for each of the stalled zones (1 through 3) is equal to four volts. Zone 4, which has an input voltage of four volts, produces an output of 8.86 volts which causes the drive roller 16 to propel loads at a speed of 0.14 m/sec. The voltage of each subsequent zone is gradually stepped up so that the speed of each subsequent zone is gradually increased in the same manner as the previous examples.

Figure 11:
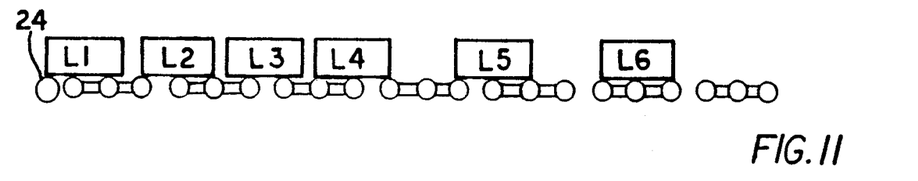
FIG. 11 is a schematic diagram showing the accumulating conveyor with the first two loads being accelerated and discharged from the conveyor.

In FIG. 11, the stop roller 24 is lowered to permit the loads to continue downstream. In FIG. 11, zone 1 has already accelerated to full speed and zone 2 is beginning to accelerate. Zones 3-5 are stalled. As shown in table 1, the input voltage to zone 1 is 22 volts, which is equal to the output voltage from the controller 32 for the stop roller 24. The output voltage of zone 1 is 22 volts, since this is the maximum output voltage of any given zone. In zone 2, which is in "accelerate" mode, the input signal is 22 volts. However, because the current limiting circuit 42 limits the current flowing through the drive roller 16 during acceleration, the output voltage of the controller 32 for zone 2 is only 6 volts. As a result, zones 3-5 will remain stalled until the load in zone 2 is accelerated sufficiently to reduce the current to below the threshold. This will cause the loads to space themselves apart to provide room for the stop roller 24 to be raised between loads. Zone 6, and each subsequent zone, are in "run" mode and continue to operate in the normal manner to gradually slow the loads as they approach the stalled load in zone 4.

Based on the foregoing, it is apparent that the present invention provides a control system for an accumulating conveyor which permits the speed of any given zone to be adjusted based on the speed of an adjacent zone of the conveyor. The control system permits the gradual deceleration of loads as they approach other stalled loads on the conveyor. Further, when the obstruction is removed, the loads are gradually accelerated to minimize jolting of the load which might disturb its contents.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

I claim:
1. An accumulating conveyor system comprising:
   (a) a plurality of load carrying rollers for propelling loads from an upstream end of the conveyor to the downstream end of the conveyor, said load carrying rollers being divided into a plurality of zones;
   (b) a variable speed drive means operatively connected with each zone of the conveyor, said drive means being capable of driving said plurality of zones at different speeds; and
   (c) control means operatively connected to said drive means for controlling the speed of each zone, said control means including means for sensing the speed of one zone of the conveyor and for varying the speed of a second zone of the conveyor based on the speed of the first zone.

2. The accumulating conveyor of claim 1 wherein the drive means includes an independent drive motor for each zone of the conveyor.

3. The accumulating conveyor of claim 2 wherein the drive means includes at least one DC powered drive roller for each zone of the conveyor.

4. The accumulating conveyor of claim 3 wherein the control means includes an individual controller for each zone operatively connected to the DC powered drive roller for that zone.

5. The accumulating conveyor of claim 4 wherein each controller includes a voltage regulating means responsive to an input voltage for producing a regulated output voltage for powering said DC powered drive rollers.

6. The accumulating conveyor of claim 5 wherein the input voltage of each controller is derived from the regulated output voltage of the controller for the next adjacent downstream zone.

7. The accumulating conveyor of claim 4 wherein each controller includes a current limiting means for limiting the current applied to the DC powered drive roller.

8. The accumulating conveyor of claim 7 wherein the current limiting means includes means for setting the current limit.

9. An accumulating conveyor system comprising:
(a) a plurality of load carrying rollers on which loads are conveyed, said load carrying rollers being divided into a plurality of successive zones; and wherein each zone includes at least one DC powered drive roller;
(b) a source of DC power for powering said drive rollers;
(c) a controller for each zone connected between the DC power source and the drive roller for that zone, each said controller including voltage regulating means for receiving a variable input signal and for providing an output signal as a function of the variable input signal, wherein the output signal from each controller provides the input signal for the next adjacent upstream controller.

10. The accumulating conveyor according to claim 9 wherein each controller includes current limiting means for limiting the current available to the drive roller.

11. The accumulating conveyor according to claim 10 wherein said current limiting means is connected in series with said voltage regulating means and reduces the supply voltage available to the voltage regulating means when the threshold current is reached.

12. The accumulating conveyor according to claim 9 further including a voltage divider connected between the DC power supply and the input of the controller.

13. The accumulating conveyor of claim 9 further including a stop disposed adjacent the downstream end of the conveyor, and movable between a raised position and a lowered position.

14. The accumulating conveyor of claim 13 wherein said stop includes a stop roller, drive means for driving said stop roller, and a control means for actuating said drive means to rotate said stop roller when it is in the lowered position.

15. A method for accumulating loads in a conveyor having a plurality of accumulating zones, comprising:
(a) sensing a first load in a first one of said accumulating zones; and
(b) progressively decelerating a subsequent load as the subsequent load approaches the first load by sensing the speed of each accumulating zone including the first zone, and continuously adjusting the speed of each subsequent zone based on the speed of the immediately preceding zone, such that the speed of the accumulating zones gradually increases through a plurality of said zones extending from said first zone.

16. The method of claim 15 further including the step of stopping each subsequent load when the subsequent load makes contact with the immediately preceding load.

17. The method of claim 15 wherein the step of continuously adjusting the speed of a subsequent zone includes receiving a variable input signal from an immediately preceding zone by a control means for subsequent zone, and producing an output signal by said control means for said subsequent zone which is a function of the variable input signal, said output signal being used to control the speed of said subsequent zone.

18. The method of claim 17 wherein the output signal from a preceding zone is transmitted to a subsequent zone and becomes the input signal for the subsequent zone.

19. The method of claim 18 wherein the signals are electrical signals.

20. The method of claim 19 wherein the signals are voltage signals.

* * * * *